Dec. 18, 1962   J. E. NORCROSS   3,068,827
CONSUMABLE WELD INSERT
Filed May 11, 1959
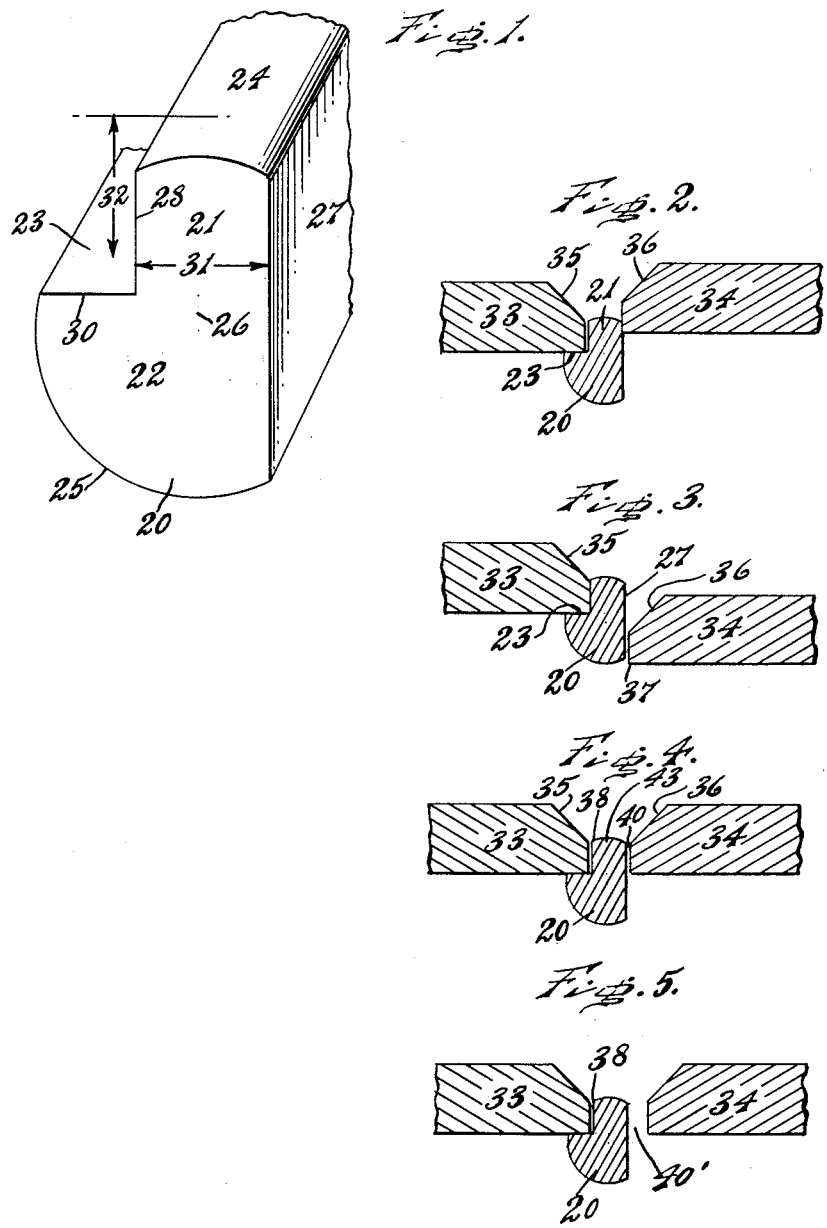
INVENTOR
James E. Norcross
BY
ATTORNEYS.

United States Patent Office 3,068,827
Patented Dec. 18, 1962

3,068,827
CONSUMABLE WELD INSERT
James E. Norcross, Media, Pa., assignor to Arcos Corporation, Philadelphia, Pa., a corporation of Pennsylvania
Filed May 11, 1959, Ser. No. 812,322
3 Claims. (Cl. 113—110)

The present invention relates to improvements in welding with consumable weld inserts, and also to improved consumable weld inserts.

A purpose of the invention is to facilitate the setup of piping and the like to be welded by consumable weld inserts.

A further purpose is to permit the consumable weld insert welding of pipes which are slightly misaligned either axially or transversely or both.

A further purpose is to eliminate the need for costly machining operations in setting up the weld with consumable weld inserts.

A further purpose is to permit welding using consumable weld inserts when the pipe has merely been flame cut and touched up slightly by grinding.

A further purpose is to increase the speed of progression in welding using consumable weld inserts.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

FIGURE 1 is a perspective of a consumable weld insert of J cross section according to the invention.

FIGURES 2 to 5 inclusive are axial sectional diagrams of the two adjoining pipes and the weld insert, which are welded in accordance with the present invention under different conditions.

Describing in illustration but not in limitation and referring to the drawings:

Considerable quantities of piping, pressure vessels, tubes, cylinders and the like are being welded according to Risch and King U.S. Patent No. 2,792,490, granted May 14, 1957, and incorporated herein by reference. This character of welding is particularly important in welding stainless steel components where excellent surface conditions are required on the inside of the pipe, and a high degree of welding quality is necessary.

Some difficulty and delay has been encountered in welding the consumable weld inserts according to the Risch et al. patent above referred to due to the importance of obtaining precise alignment of the pipes, and the necessity of extensive machining of the ends which are to be welded.

While it will be appreciated that an insert of rectangular cross section might conceivably be used, an insert of this character presents the difficulty that it does not self align with respect to the piping on either side, and therefore must either be held by auxiliary equipment during fit-up or must be tack welded in place. Furthermore, an insert of rectangular cross section provides a relatively small amount of available metal to fill the joint during fusion.

The present invention is concerned with welding following the general technique suggested by the Risch et al. patent, where slight misalignment of the pipes occurs, or where accurate machining in preparation for welding is not economical.

The invention offers the advantage of providing satisfactory weld quality even though the pipes are slightly misaligned, or the ends of the pipes are not prepared according to the best practice. The invention also offers the benefit of somewhat increased welding speeds, and higher welding ranges.

The invention is particularly applicable to welding of pipes or the like of stainless steel, either of the chromium-nickel grades or of the straight chromium grades, using consumable weld inserts of similar analyses. It likewise is useful in welding plain carbon steel pipes using plain carbon steel or stainless steel consumable weld inserts.

In accordance with the invention the consumable weld insert 20 has a rib 21, a bulbous portion 22 having a flange and a pipe fitting recess 23. In the best embodiment of the invention, the outer contour of the rib 21 is circular at 24 and the outer contour of the bulbous portion 22 is circular at 25, both circles being of the same radius about a center 26. The rib 24 terminates opposite the bottom 30 of the pipe locating recess and the rib 24 has a straight side 27. The straight side 27 extends in prolongation along the corresponding side of the bulbous portion until it encounters the circular exterior contour 25 of the bulbous portion. The rib 21 also has an opposite straight side 28 parallel to the straight side 27 and forming one side of the pipe locating recess 23. The opposite side of the pipe locating recess 23 is at 30 transverse to the straight sides 27 and 28.

As shown, the rib 24 is desirably symmetrical with respect to the center 26. The width of the rib as shown by the dimension 31 is desirably from ¼ to ½ the diameter of the circle. The depth of the pipe locating recess 23 as shown at 32 measured from a tangent to the rib at the top is also desirably from ¼ to ½ the diameter of the circle. The dimension 31 is preferably about ⅜ the diameter of the circle and the dimension 32 is about ⅜ the diameter of the circle in the preferred embodiment.

It will of course be evident that the greater part of the cross section is contained in the bulbous portion 22 and the smaller portion of the cross section is contained in the rib 21. The cross sectional diameter of the consumable weld insert will of course depend upon the wall thickness of the pipe, but it is believed to be desirable to employ diameters of the order of 5/32" or 3/16".

It will of course be understood that the consumable weld insert will be formed into rings in any suitable manner, as for example by shaping and tack welding, or by machining from ring material.

The 5/32" cross sectional diameter consumable weld insert of the present invention has the same amount of metal for fusion as the ⅛" consumable weld insert according to the Risch et al. patent above referred to.

I illustrate various piping setups which are permissible for welding according to the present invention. In FIGURE 2 one pipe 33 is misaligned with the other pipe 34 by a distance which may be of the order of 3/32" in welding pipe of the character of 4" or 6" diameter. The consumable weld insert 20 is placed between the abutting ends which have been chamfered at 35 and 36.

It will be noted that pipe 34 engages the rib 21 at a position which is relatively high in FIGURE 2 while pipe 33 fits properly in groove 23.

According to the technique of the Risch et al. patent, using no backup device such as a chill plate or permanent backup strip with the parts placed as in FIGURE 2, the welding torch is moved along the outside or upper side of the weld space and sufficient heat supplied through the top to completely melt the weld insert to form successive weld puddles as the torch advances, the heat completely melting the consumable insert and the parent metal of the pipes to weld them together where they abut the insert to form successive molten weld puddles containing both metal of the consumable weld insert and metal of the parent metal combined into the molten puddles, so that a homogeneous weld is formed which is substantially smooth on the inside of the pipe.

FIGURE 3 illustrates a different case of misalignment in which the pipe 34 engages the side 27 of the consumable weld insert at a position which in FIGURE 3 is lower than the position of the pipe 33, which fits properly in the recess 23.

Again it is possible by the technique described to obtain adequate welds even though there is a slight space 37 between the weld insert and the pipe 34.

In FIGURE 4 it is noted that the pipes 33 and 34 are properly aligned axially but they are not as close together at the point shown in FIGURE 4 as would be desired, so that there are slight spaces 38 and 40 between the rib 21 and the ends of the pipes.

Notwithstanding this it is possible to obtain good welding by the technique of the present invention.

FIGURE 5 shows an aggravated case in which the condition shown in FIGURE 4 is extreme in the case of the space 40'. Notwithstanding this difficulty, it is possible to form satisfactory welds according to the invention with a spacing of as much as 3/32 of an inch at 40'.

Tests have been made with the weld insert of the present invention using pipes which have merely been flame cut and then touched up with a grinder, without precisely machining the ends. Good welds have been secured, thus greatly reducing the cost of preparation for welding.

In view of my invention and disclosure, variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. A consumable weld insert of a cross section adapted to be interposed between two abutting members to be welded, said cross section having an integral bulbous portion and a rib portion, the perimeter of said bulbous portion in cross section comprising an arc which extends more than 90 degrees about the center of the cross section, a first straight line extending toward the center of the cross section and a second straight line extending at right angles to the first straight line, the perimeter of said rib portion in cross section comprising a third straight line which is at right angles to first said straight line, a fourth straight line which is in prolongation of said second straight line and a fifth line which joins the said third straight line and the said fourth stright line wherein the said arc and lines represent end projections of surfaces of said weld insert, and wherein the width of the rib in said cross section is between one-quarter and one-half of the diameter of the said cross section and the height of said rib in cross section is between one-fourth and one-half of the diameter of the said cross section.

2. A consumable weld insert of claim 1, in which the said fifth line of the rib comprises an arc around the said center.

3. A consumable weld insert of claim 2, in which the width of the rib in cross section is approximately three-eighths of the diameter and the height of the rib is approximately three-eighths of the diameter of the said cross section.

References Cited in the file of this patent

UNITED STATES PATENTS

| | | |
|---|---|---|
| 2,028,233 | Naeder | Jan. 21, 1936 |
| 2,119,999 | Naeder | June 7, 1938 |
| 2,659,966 | Turnbull | Nov. 23, 1953 |
| 2,792,490 | Risch et al. | May 14, 1957 |

FOREIGN PATENTS

| | | |
|---|---|---|
| 359,813 | Germany | Sept. 26, 1922 |
| 782,927 | Great Britain | Sept. 18, 1957 |